(12) United States Patent
Kincaid et al.

(10) Patent No.: US 10,552,162 B2
(45) Date of Patent: Feb. 4, 2020

(54) VARIABLE LATENCY FLUSH FILTERING

(71) Applicant: International Business Machines Corporation, Armonk, NY (US)

(72) Inventors: Glenn O. Kincaid, Austin, TX (US); David S. Levitan, Austin, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/876,273

(22) Filed: Jan. 22, 2018

(65) Prior Publication Data

US 2019/0227806 A1 Jul. 25, 2019

(51) Int. Cl.
G06F 9/38 (2018.01)
G06F 9/30 (2018.01)

(52) U.S. Cl.
CPC .......... G06F 9/3855 (2013.01); G06F 9/3016 (2013.01)

(58) Field of Classification Search
None
See application file for complete search history.

(56) References Cited

U.S. PATENT DOCUMENTS

| | | | |
|---|---|---|---|
| 5,522,084 A * | 5/1996 | Ando | G06F 9/30072 712/23 |
| 5,895,497 A * | 4/1999 | Anderson | G06F 9/30043 711/117 |
| 6,157,995 A * | 12/2000 | Asato | G06F 9/30094 712/25 |
| 6,289,442 B1 * | 9/2001 | Asato | G06F 9/3804 712/206 |
| 6,510,508 B1 | 1/2003 | Zuraski, Jr. et al. | |
| 6,694,425 B1 * | 2/2004 | Eickemeyer | G06F 9/3851 712/216 |
| 6,804,770 B2 * | 10/2004 | Logan | G06F 9/3861 711/135 |
| 7,490,221 B2 | 2/2009 | Evans et al. | |
| 9,069,563 B2 | 6/2015 | Konigsburg et al. | |
| 9,081,707 B2 | 7/2015 | Conrad et al. | |
| 9,483,267 B2 * | 11/2016 | Gschwind | G06F 9/30072 |
| 2004/0168045 A1 * | 8/2004 | Morris | G06F 9/383 712/225 |
| 2007/0250666 A1 * | 10/2007 | Sartorius | G06F 12/0891 711/133 |
| 2008/0140897 A1 | 6/2008 | Ganguly | |
| 2009/0210673 A1 * | 8/2009 | Luick | G06F 9/30021 712/216 |
| 2017/0177367 A1 * | 6/2017 | DeHon | G06F 9/30101 |

* cited by examiner

*Primary Examiner* — Eric Coleman
(74) *Attorney, Agent, or Firm* — Bryan Bortnick

(57) ABSTRACT

Variable latency flush filtering including receiving a first flush instruction tag (ITAG) and a second flush ITAG, wherein the first flush ITAG and the second flush ITAG are instructions to invalidate internal operation results after an internal operation identified by the first flush ITAG and the second flush ITAG; determining that the second flush ITAG is before the first flush ITAG by comparing the first flush ITAG and the second flush ITAG; determining that the first flush ITAG requires adjustment; and delaying the flush to a subsequent cycle in response to determining that the second flush ITAG is before the first flush ITAG and determining that the first flush ITAG requires adjustment.

20 Claims, 6 Drawing Sheets

VARIABLE LATENCY FLUSH FILTERING

BACKGROUND

Field of the Invention

The field of the invention is data processing, or, more specifically, methods, apparatus, and products for variable latency flush filtering.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for variable latency flush filtering are disclosed in this specification. Variable latency flush filtering includes receiving a first flush instruction tag (ITAG) and a second flush ITAG, wherein the first flush ITAG and the second flush ITAG are instructions to invalidate internal operation results after an internal operation identified by the first flush ITAG and the second flush ITAG; determining that the second flush ITAG is before the first flush ITAG by comparing the first flush ITAG and the second flush ITAG; determining that the first flush ITAG requires adjustment; and delaying the flush to a subsequent cycle in response to determining that the second flush ITAG is before the first flush ITAG and determining that the first flush ITAG requires adjustment.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
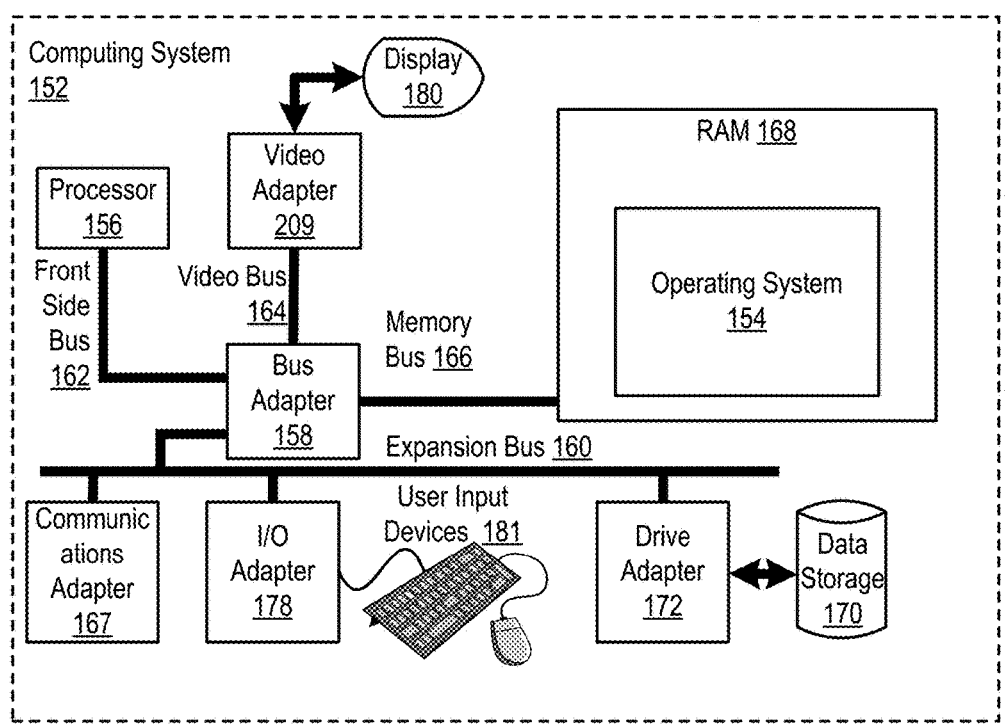
FIG. 1 sets forth a block diagram of an example system configured for variable latency flush filtering according to embodiments of the present invention.

Exemplary methods, apparatus, and products for variable latency flush filtering in accordance with the present invention are described with reference to the accompanying drawings, beginning with FIG. 1. FIG. 1 sets forth a block diagram of automated computing machinery comprising an exemplary computing system (152) configured for variable latency flush filtering according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for variable latency flush filtering according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for variable latency flush filtering according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for variable latency flush filtering according to embodiments of the present invention include modems for wired dial-up communications, Ethernet (IEEE 802.3) adapters for wired data communications, and 802.11 adapters for wireless data communications.

Figure 2:
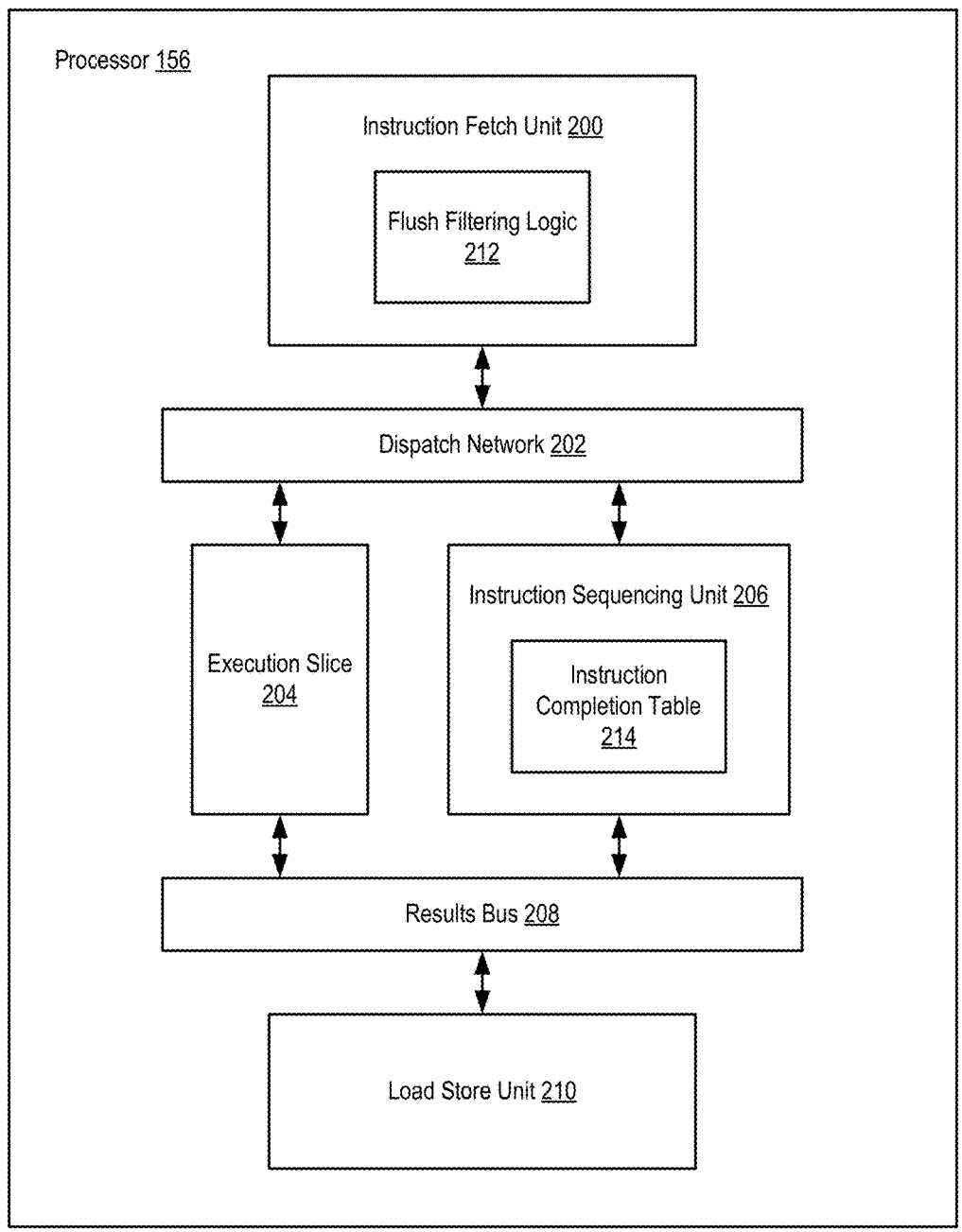
FIG. 2 sets forth a block diagram of an example system configured for variable latency flush filtering according to embodiments of the present invention.

FIG. 2 shows an exemplary processor (156) for variable latency flush filtering according to embodiments of the present invention. As shown in FIG. 2, the exemplary processor (156) includes an instruction fetch unit (IFU) (200), a dispatch network (202), an execution slice (204), an instruction sequencing unit (ISU) (206), a results bus (208) and a load store unit (LSU) (210). The IFU (200) includes flush filtering logic (212), and the ISU (206) includes an instruction completion table (ICT) (214).

The processor (156) may be a multi-slice processor. The term 'multi-slice' as used in this specification refers to a processor having a plurality of similar or identical sets of components, where each set may operate independently of all the other sets or in concert with the one or more of the other sets. A multi-slice processor may include several execution slices (204) and several LSUs (210). Each execution slice (204) may be configured to provide components that support execution of instructions: an issue queue, general purpose registers, a history buffer, an arithmetic logic unit (including a vector scalar unit, a floating point unit, and others), and the like. Each of the LSUs (210) may be configured with components that support data movement operations such as loading of data from cache or memory or storing data in cache or memory. In some embodiments, each of the LSUs (210) includes a data cache. The LSUs (210) are coupled to the execution slices (204) through the results bus (208). In some embodiments, each execution slice (204) may be associated with a single LSU (210) to form a single processor slice. In some embodiments, multiple processor slices may be configured to operate together. A multi-slice processor may also include other processor components, such as fetch logic, dispatch logic, and branch prediction logic.

The IFU (200) is logic within the processor (156) configured to decode processor instructions and provide the decoded processor instructions to the dispatch network (202). A processor instruction is an instruction formatted for the processor and received by the IFU (200). Each processor instruction may be decoded into one or more internal operations (IOPs).

An IOP is an instruction used internally by the processor (156) to carry out activities described by the processor instructions. Each IOP is assigned an instruction tag (ITAG). An ITAG is an identifier for an IOP used by elements within the processor (156) to track the execution of each IOP. The IOPs may be processed or executed in any order, but are completed in the order of IOP's ITAG.

A flush ITAG is an instruction to invalidate the IOP results after, or based on, the IOP identified by the flush ITAG. The flush ITAG is an instruction to invalidate some or all of the IOPs with ITAGs issued after (i.e., younger than) the ITAG provided in the flush ITAG instruction. Different types of flush ITAGs may indicate a different set of IOP results after, before, or including the flush ITAG. Consequently, some flush ITAGs require adjustment before the IOP results may be invalidated. Adjusting a flush ITAG may include identifying a type of flush ITAG received, and adjusting the flush ITAG based on the type of flush ITAG received. A non-branch flush is a flush of the IOPs of a single thread. In this disclosure, the term flush refers to a non-branch flush.

The IFU (200) includes flush filtering logic (212). The flush filtering logic (212) is hardware, software, or an aggregation of hardware and software that receives flush ITAGs and determines which flush ITAG to broadcast to the ICT (214). The flush filtering logic (212) also detects a type of flush ITAG received and determines whether the flush ITAG requires adjustment before broadcasting.

Flush ITAGs may be instructions to invalidate IOP results using the ICT (214). The ICT (214) is an index of each ITAG and stores information regarding whether the IOP associated with the ITAG has met the requirements for completion. Upon receiving a flush ITAG from the flush filtering logic (212), the ICT may invalidate the progress recorded in the ICT (214) (i.e., flush the ICT) based on the received flush ITAG, and initiate a re-execution of the IOPs associated with the flushed ITAGs.

The LSU (210) may detect hazards and issue flush ITAGs to the IFU (200) in response to the detected hazards. A hazard occurs if two or more IOPS are carried out in a way the that causes unintended results. For example, a store-hit-load hazard may occur in when a load IOP reads from a location in cache or from memory before the expected result data has been stored (e.g., via a store IOP) in that location.

Figure 3:
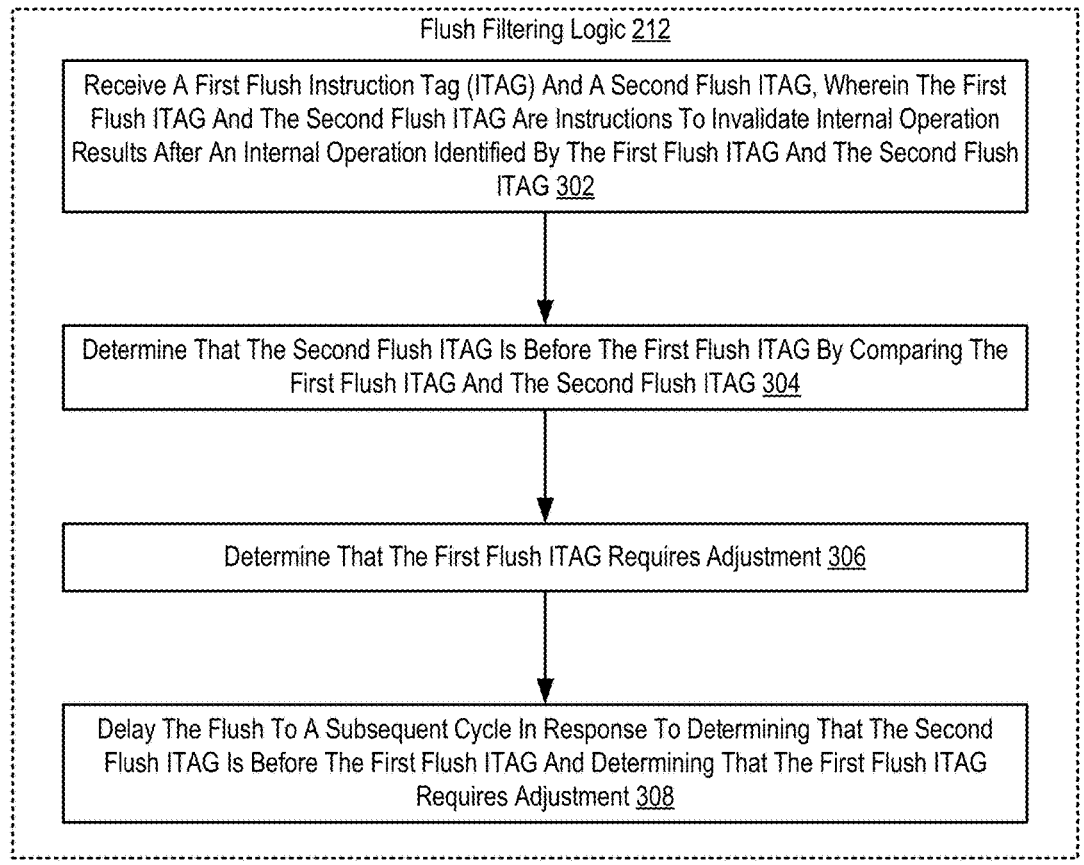
FIG. 3 sets forth a flow chart illustrating an exemplary method for variable latency flush filtering according to embodiments of the present invention.

For further explanation, FIG. 3 sets forth a flow chart illustrating an exemplary method for variable latency flush filtering according to embodiments of the present invention that includes receiving (302) a first flush instruction tag (ITAG) and a second flush ITAG, wherein the first flush ITAG and the second flush ITAG are instructions to invalidate internal operation results after an internal operation identified by the first flush ITAG and the second flush ITAG. Receiving (302) a first flush ITAG and a second flush ITAG, wherein the first flush ITAG and the second flush ITAG are instructions to invalidate internal operation results after an internal operation identified by the first flush ITAG and the second flush ITAG may be carried out by the flush filtering logic (212) detecting two or more flush ITAGs sent from the LSU to the IFU. During each cycle, the IFU may receive zero or more flush ITAGs. The LSU may detect multiple hazards for a thread and issue different flush ITAGs to the IFU based on the detected hazards. The received flush ITAGs may be instructions to invalidate the IOP results for the same thread.

For example, the flush filtering logic (212) may receive a first flush ITAG of 9 instructing that the TOP associated with ITAG 9 be flushed along with each TOP with an ITAG younger (i.e., greater) than ITAG 9. During the same cycle, the flush filtering logic (212) may receive a second flush ITAG of '10' instructing that the TOP associated with ITAG 10 be flushed along with each TOP with an ITAG younger (i.e., greater) than ITAG 10.

The method of FIG. 3 further includes determining (304) that the second flush ITAG is before the first flush ITAG by comparing the first flush ITAG and the second flush ITAG. Determining (304) that the second flush ITAG is before the first flush ITAG by comparing the first flush ITAG and the second flush ITAG may be carried out by the flush filtering logic (212) comparing the received flush ITAGs during the same cycle they are received or during a subsequent cycle, such as the next cycle after the flush ITAGs are received.

The method of FIG. 3 further includes determining (306) that the first flush ITAG requires adjustment. Determining (306) that the first flush ITAG requires adjustment may be carried out by identifying a type of flush ITAG received. The type of adjustment required may depend on the type of flush ITAG received. Therefore, the flush filtering logic (212) may identify the type of flush ITAG received in order to determine whether the flush ITAG requires adjustment and the type of adjustment to make to the flush ITAG.

Different hazards may trigger different flush ITAG types, and different flush ITAG types may indicate a different ITAG, relative to the provided flush ITAG, from which the flush is to be performed. One type of flush ITAG may provide the ITAG of the first and oldest ITAG to be flushed. Another type of flush ITAG may provide the ITAG immediately before (i.e., older than) the first and oldest ITAG to be flushed. Another type of flush ITAG may provide the ITAG immediately after (i.e., younger than) the first and oldest ITAG to be flushed. For example, an 'n-flush' type of flush ITAG may indicate the ITAG of the IOP that should be flushed along with each younger ITAG.

In addition, flush ITAGs may be provided in the context of the processor instructions from which the IOPs were decoded. A 'next processor instruction flush' may provide the first ITAG of an IOP decoded from a particular processor instruction and indicate that each IOP after the IOPs decoded from the particular processor instruction are to be flushed. A 'second atomic n-flush' may provide the second ITAG of an IOP decoded from a particular processor instruction and indicate that each IOP including the IOPs decoded from the particular processor instruction are to be flushed. Finally, a 'second atomic and next processor instruction flush' may provide the second ITAG of an IOP decoded from a particular processor instruction and indicate that each IOP after the IOPs decoded from the particular processor instruction are to be flushed.

Depending on the flush ITAG type, the flush filtering logic (212) may adjust the flush ITAG accordingly. For example, a processor instruction may be decoded into two IOPs with ITAGs 9 and 10. At some point during execution, the flush filtering logic (212) may receive a flush ITAG for ITAG 10, with a flush ITAG type indicating that each IOP decoded from the processor instruction should be flushed along with all younger ITAGs. Because ITAG 10 is only the second ITAG issued to the IOPs decoded from the processor instruction, the flush filtering logic must adjust the flush ITAG so that each IOP from the processor instruction is flushed, including the older IOP associated with ITAG 9.

The method of FIG. 3 further includes delaying (308) the flush to a subsequent cycle in response to determining that the second flush ITAG is before the first flush ITAG and determining that the first flush ITAG requires adjustment. Delaying (308) the flush to a subsequent cycle in response to determining that the second flush ITAG is before the first flush ITAG and determining that the first flush ITAG requires adjustment may be carried out by the flush filtering logic (212) detecting that the conditions for delaying the flush have been satisfied.

The flush filtering logic (212) may only delay the flush (or broadcasting of the flush ITAG) if the flush ITAG requiring adjustment is not determined to be the oldest received flush ITAG (i.e., is before other flush ITAGs received in the current cycle). If neither received flush ITAG requires adjustment, then the flush filtering logic (212) may broadcast (or allow to be broadcasted) the oldest flush ITAG based on the comparison of the first flush ITAG and the second flush ITAG.

Figure 4:
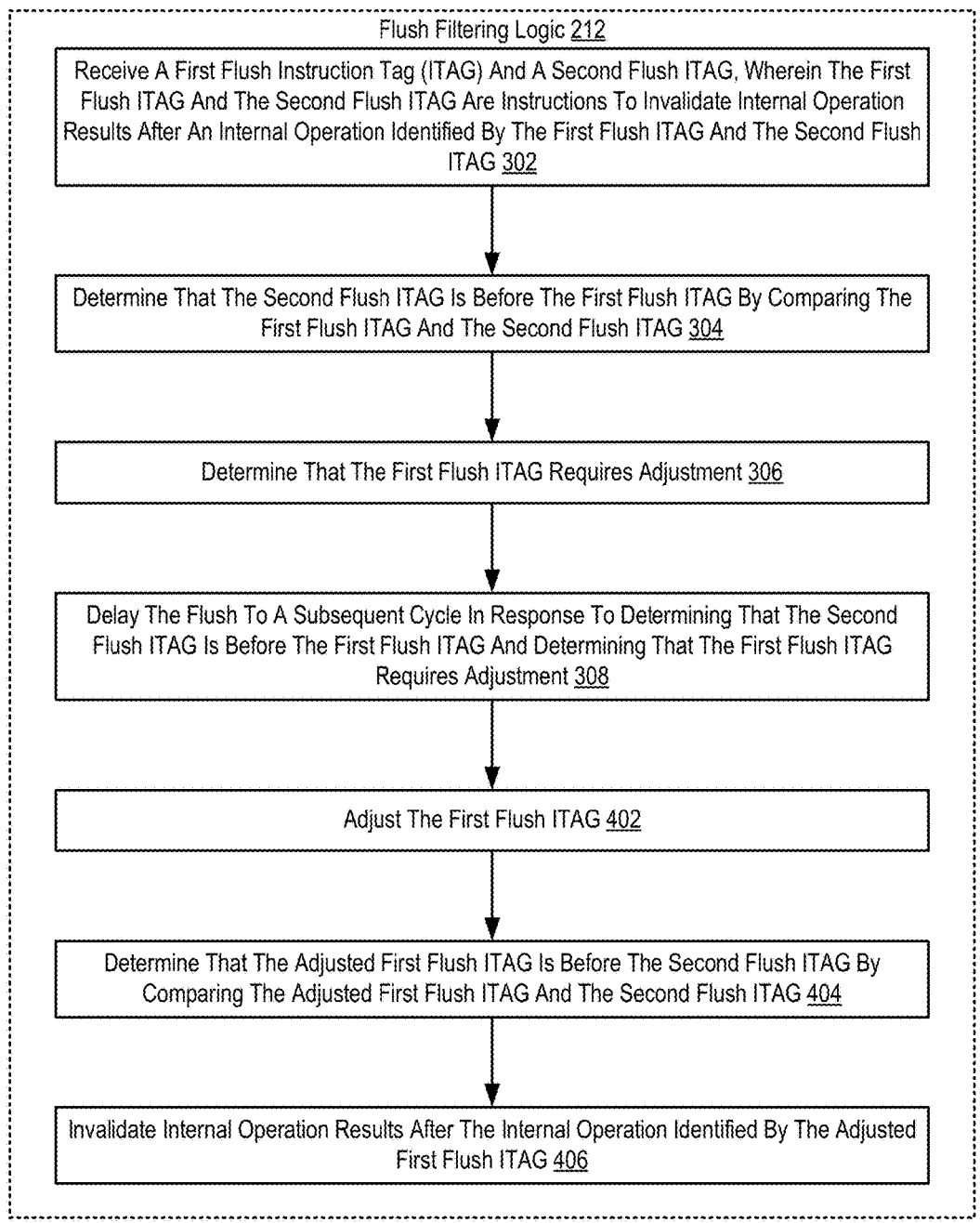
FIG. 4 sets forth a flow chart illustrating an exemplary method for variable latency flush filtering according to embodiments of the present invention.

For further explanation, FIG. 4 sets forth a flow chart illustrating a further exemplary method for variable latency flush filtering according to embodiments of the present invention that includes receiving (302) a first flush instruction tag (ITAG) and a second flush ITAG, wherein the first flush ITAG and the second flush ITAG are instructions to invalidate internal operation results after an internal operation identified by the first flush ITAG and the second flush ITAG; determining (304) that the second flush ITAG is before the first flush ITAG by comparing the first flush ITAG and the second flush ITAG; determining (306) that the first flush ITAG requires adjustment; and delaying (308) the flush to a subsequent cycle in response to determining that the second flush ITAG is before the first flush ITAG and determining that the first flush ITAG requires adjustment.

The method of FIG. 4 differs from the method of FIG. 3, however, in that the method of FIG. 4 further includes adjusting (402) the first flush ITAG. Adjusting (402) the first flush ITAG may be carried out by the flush filtering logic (212) during a subsequent processor cycle. Adjusting the first flush ITAG may include adding or subtracting one or more ITAG units from the flush ITAG depending upon the flush ITAG type. For example, a 'second atomic n flush' may require an adjustment of subtracting one ITAG unit from the flush ITAG, such as receiving a flush ITAG of 10 and subtracting 1 resulting in a flush ITAG of 9.

The method of FIG. 4 further includes determining (404) that the adjusted first flush ITAG is before the second flush ITAG by comparing the adjusted first flush ITAG and the second flush ITAG. Determining (404) that the adjusted first flush ITAG is before the second flush ITAG by comparing the adjusted first flush ITAG and the second flush ITAG may be carried out by the flush filtering logic (212) during the subsequent processor cycle or a later processor cycle.

The method of FIG. 4 further includes invalidating (406) internal operation results after the internal operation identified by the adjusted first flush ITAG. Invalidating (406) internal operation results after the internal operation identified by the adjusted first flush ITAG may be carried out by the flush filtering logic (212) broadcasting the adjusted first flush ITAG to the ISU and the ICT. In response, the ICT may invalidate the TOP results for the TOP identified by the adjusted first flush ITAG and each TOP younger than the adjusted first flush ITAG. The ISU may then initiate the re-execution of the flushed IOPs.

Figure 5:
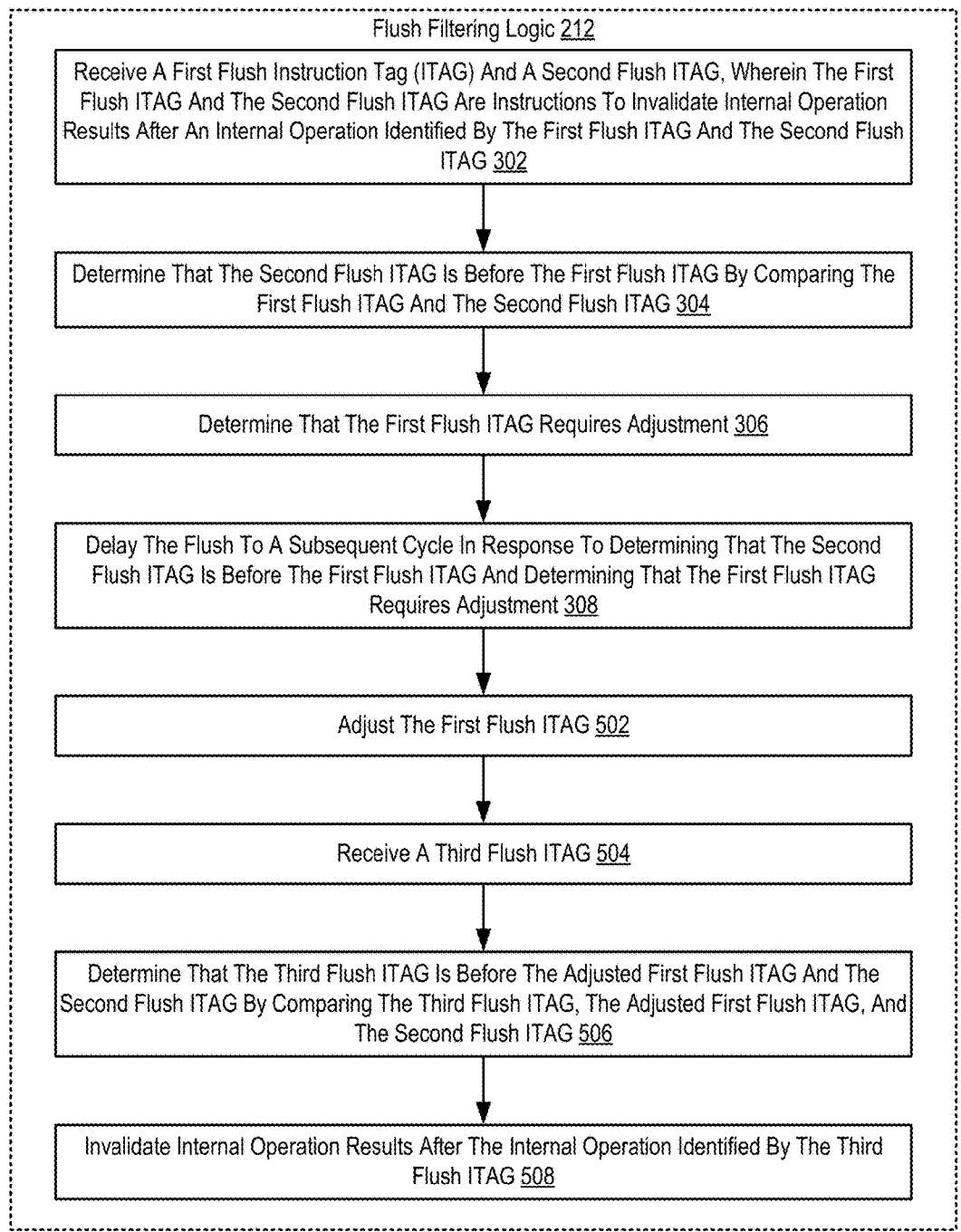
FIG. 5 sets forth a flow chart illustrating an exemplary method for variable latency flush filtering according to embodiments of the present invention.

For further explanation, FIG. 5 sets forth a flow chart illustrating a further exemplary method for variable latency flush filtering according to embodiments of the present invention that includes receiving (302) a first flush instruction tag (ITAG) and a second flush ITAG, wherein the first flush ITAG and the second flush ITAG are instructions to invalidate internal operation results after an internal operation identified by the first flush ITAG and the second flush ITAG; determining (304) that the second flush ITAG is before the first flush ITAG by comparing the first flush ITAG and the second flush ITAG; determining (306) that the first flush ITAG requires adjustment; and delaying (308) the flush to a subsequent cycle in response to determining that the second flush ITAG is before the first flush ITAG and determining that the first flush ITAG requires adjustment.

The method of FIG. 5 differs from the method of FIG. 3, however, in that the method of FIG. 5 further includes adjusting (502) the first flush ITAG. Adjusting (502) the first flush ITAG may be carried out by the flush filtering logic (212) during a subsequent processor cycle. Adjusting the first flush ITAG may include adding or subtracting one or more ITAG units from the flush ITAG depending upon the flush ITAG type.

The method of FIG. 5 further includes receiving (504) a third flush ITAG. Receiving (504) a third flush ITAG may be carried out by the flush filtering logic (212) detecting the third flush ITAG sent from the LSU to the IFU. The third flush ITAG may be received during the subsequent cycle or another cycle after the cycle in which the first flush ITAG and the second flush ITAG are received.

The method of FIG. 5 further includes determining (506) that the third flush ITAG is before the adjusted first flush ITAG and the second flush ITAG by comparing the third flush ITAG, the adjusted first flush ITAG, and the second flush ITAG. Determining (506) that the third flush ITAG is before the adjusted first flush ITAG and the second flush ITAG by comparing the third flush ITAG, the adjusted first flush ITAG, and the second flush ITAG may be carried out by the flush filtering logic (212) during the cycle in which the third flush ITAG is received, in the cycle immediately following the cycle in which the third flush ITAG is received, or during a later cycle.

The method of FIG. 5 further includes invalidating (508) internal operation results after the internal operation identified by the third flush ITAG. Invalidating (508) internal operation results after the internal operation identified by the third flush ITAG may be carried out by the flush filtering logic (212) broadcasting the third flush ITAG to the ISU and the ICT. In response, the ICT may invalidate the TOP results for the TOP identified by the third flush ITAG and each TOP younger than the third flush ITAG. The ISU may then initiate the re-execution of the flushed IOPs.

Figure 6:
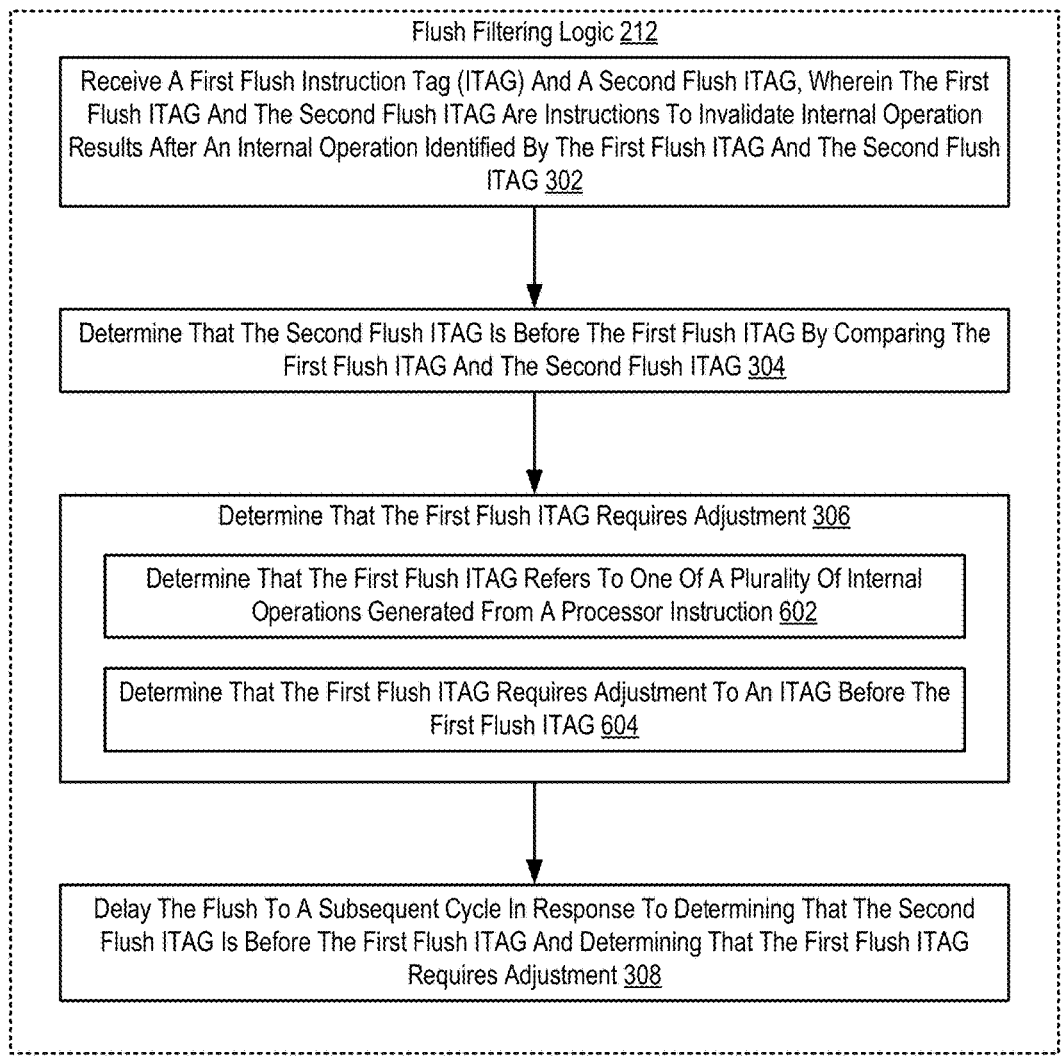
FIG. 6 sets forth a flow chart illustrating an exemplary method for variable latency flush filtering according to embodiments of the present invention.

For further explanation, FIG. 6 sets forth a flow chart illustrating a further exemplary method for variable latency flush filtering according to embodiments of the present invention that includes receiving (302) a first flush instruction tag (ITAG) and a second flush ITAG, wherein the first flush ITAG and the second flush ITAG are instructions to invalidate internal operation results after an internal operation identified by the first flush ITAG and the second flush ITAG; determining (304) that the second flush ITAG is before the first flush ITAG by comparing the first flush ITAG and the second flush ITAG; determining (306) that the first flush ITAG requires adjustment; and delaying (308) the flush to a subsequent cycle in response to determining that the second flush ITAG is before the first flush ITAG and determining that the first flush ITAG requires adjustment.

The method of FIG. 6 differs from the method of FIG. 3, however, in that determining (306) that the first flush ITAG requires adjustment includes determining (602) that the first flush ITAG refers to one of a plurality of internal operations generated from a processor instruction; and determining (604) that the first flush ITAG requires adjustment to an ITAG before the first flush ITAG.

Determining (602) that the first flush ITAG refers to one of a plurality of internal operations generated from a processor instruction may be carried out by the flush filtering logic (212) detecting that the first flush ITAG matches a particular flush ITAG type. If the first flush ITAG matches a particular flush ITAG type, then the first flush ITAG may require adjustment before being broadcast to the IFU and the ICT.

Determining (604) that the first flush ITAG requires adjustment to an ITAG before the first flush ITAG may be carried out by the flush filtering logic (212) detecting that the first flush ITAG matches a flush ITAG type indicating that the targeted flush ITAG is before (i.e., older) than the provided first flush ITAG. The required adjustment may be to an ITAG corresponding to the oldest ITAG issued to the IOPs of a particular processor instruction.

In view of the explanations set forth above, readers will recognize that the benefits of variable latency flush filtering according to embodiments of the present invention include:

Improving the operation of a computing system by minimizing cycle delays when flushing the IOPs for a processor thread, increasing computing system efficiency.

Improving the operation of a computing system by filter flush types and taking action tailored to the type of flush detected, increasing computing system functionality and efficiency.

Exemplary embodiments of the present invention are described largely in the context of a fully functional computer system for variable latency flush filtering. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of variable latency flush filtering, the method comprising:
   receiving a first flush instruction tag (ITAG) and a second flush ITAG, wherein the first flush ITAG and the second flush ITAG are instructions to invalidate internal operation results after an internal operation identified by the first flush ITAG and the second flush ITAG;
   determining that the second flush ITAG is before the first flush ITAG by comparing the first flush ITAG and the second flush ITAG;
   determining that the first flush ITAG requires adjustment; and
   delaying the flush to a subsequent cycle in response to determining that the second flush ITAG is before the first flush ITAG and determining that the first flush ITAG requires adjustment.

2. The method of claim 1, further comprising:
   adjusting the first flush ITAG;
   determining that the adjusted first flush ITAG is before the second flush ITAG by comparing the adjusted first flush ITAG and the second flush ITAG; and
   invalidating internal operation results after the internal operation identified by the adjusted first flush ITAG.

3. The method of claim 1, further comprising:
   adjusting the first flush ITAG;
   receiving a third flush ITAG;
   determining that the third flush ITAG is before the adjusted first flush ITAG and the second flush ITAG by comparing the third flush ITAG, the adjusted first flush ITAG, and the second flush ITAG; and
   invalidating internal operation results after the internal operation identified by the third flush ITAG.

4. The method of claim 1, wherein determining that the first flush ITAG requires adjustment comprises determining that the first flush ITAG requires adjustment to an ITAG before the first flush ITAG.

5. The method of claim 1, wherein determining that the first flush ITAG requires adjustment comprises determining that the first flush ITAG refers to one of a plurality of internal operations generated from a processor instruction.

6. The method of claim 1, wherein the first flush ITAG and the second flush ITAG are received from a load store unit of a multi-slice processor.

7. The method of claim 1, wherein the first flush ITAG and the second flush ITAG are instructions to invalidate internal operation results using an instruction completion table.

8. An apparatus for variable latency flush filtering, the apparatus comprising a computer processor, a computer memory operatively coupled to the computer processor, the computer memory having disposed within it computer program instructions that, when executed by the computer processor, cause the apparatus to carry out the steps of:
receiving a first flush instruction tag (ITAG) and a second flush ITAG, wherein the first flush ITAG and the second flush ITAG are instructions to invalidate internal operation results after an internal operation identified by the first flush ITAG and the second flush ITAG;
determining that the second flush ITAG is before the first flush ITAG by comparing the first flush ITAG and the second flush ITAG;
determining that the first flush ITAG requires adjustment; and
delaying the flush to a subsequent cycle in response to determining that the second flush ITAG is before the first flush ITAG and determining that the first flush ITAG requires adjustment.

9. The apparatus of claim 8, wherein the computer program instructions further cause the apparatus to carry out the steps of:
adjusting the first flush ITAG;
determining that the adjusted first flush ITAG is before the second flush ITAG by comparing the adjusted first flush ITAG and the second flush ITAG; and
invalidating internal operation results after the internal operation identified by the adjusted first flush ITAG.

10. The apparatus of claim 8, wherein the computer program instructions further cause the apparatus to carry out the steps of:
adjusting the first flush ITAG;
receiving a third flush ITAG;
determining that the third flush ITAG is before the adjusted first flush ITAG and the second flush ITAG by comparing the third flush ITAG, the adjusted first flush ITAG, and the second flush ITAG; and
invalidating internal operation results after the internal operation identified by the third flush ITAG.

11. The apparatus of claim 8, wherein determining that the first flush ITAG requires adjustment comprises determining that the first flush ITAG requires adjustment to an ITAG before the first flush ITAG.

12. The apparatus of claim 8, wherein determining that the first flush ITAG requires adjustment comprises determining that the first flush ITAG refers to one of a plurality of internal operations generated from a processor instruction.

13. The apparatus of claim 8, wherein the first flush ITAG and the second flush ITAG are received from a load store unit of a multi-slice processor.

14. The apparatus of claim 8, wherein the first flush ITAG and the second flush ITAG are instructions to invalidate internal operation results using an instruction completion table.

15. A computer program product for variable latency flush filtering, the computer program product disposed upon a computer readable storage medium, the computer program product comprising computer program instructions that, when executed, cause a computer to carry out the steps of:
receiving a first flush instruction tag (ITAG) and a second flush ITAG, wherein the first flush ITAG and the second flush ITAG are instructions to invalidate internal operation results after an internal operation identified by the first flush ITAG and the second flush ITAG;
determining that the second flush ITAG is before the first flush ITAG by comparing the first flush ITAG and the second flush ITAG;
determining that the first flush ITAG requires adjustment; and
delaying the flush to a subsequent cycle in response to determining that the second flush ITAG is before the first flush ITAG and determining that the first flush ITAG requires adjustment.

16. The computer program product of claim 15, wherein the computer program instructions further cause the computer to carry out the steps of:
adjusting the first flush ITAG;
determining that the adjusted first flush ITAG is before the second flush ITAG by comparing the adjusted first flush ITAG and the second flush ITAG; and
invalidating internal operation results after the internal operation identified by the adjusted first flush ITAG.

17. The computer program product of claim 15, wherein the computer program instructions further cause the computer to carry out the steps of:
adjusting the first flush ITAG;
receiving a third flush ITAG;
determining that the third flush ITAG is before the adjusted first flush ITAG and the second flush ITAG by comparing the third flush ITAG, the adjusted first flush ITAG, and the second flush ITAG; and
invalidating internal operation results after the internal operation identified by the third flush ITAG.

18. The computer program product of claim 15, wherein determining that the first flush ITAG requires adjustment comprises determining that the first flush ITAG requires adjustment to an ITAG before the first flush ITAG.

19. The computer program product of claim 15, wherein determining that the first flush ITAG requires adjustment comprises determining that the first flush ITAG refers to one of a plurality of internal operations generated from a processor instruction.

20. The computer program product of claim 15, wherein the first flush ITAG and the second flush ITAG are received from a load store unit of a multi-slice processor.

* * * * *